United States Patent Office 3,107,217
Patented Oct. 15, 1963

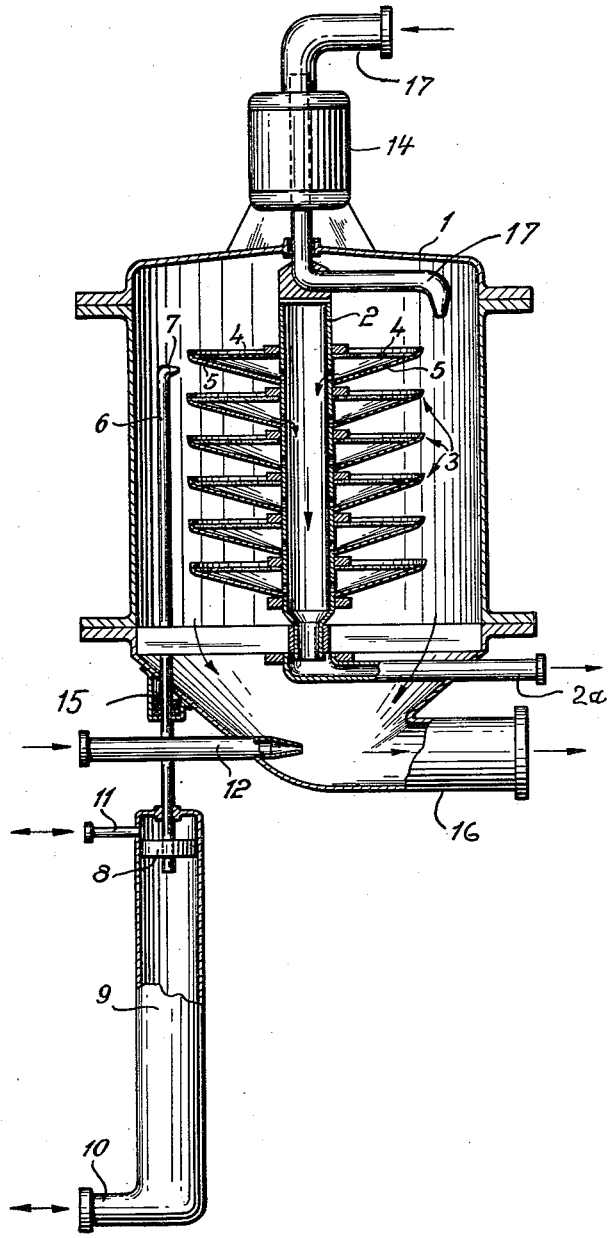

3,107,217
ARRANGEMENT FOR THE CONTINUOUS SEPARATION OF SOLIDS AND LIQUIDS BY FILTRATION
Hans Müller, Allmendli, Erlenbach, Switzerland
Filed Jan. 23, 1958, Ser. No. 710,635
2 Claims. (Cl. 210—331)

The present invention relates to a filter of the type in which the ejection of the residue from the disc-shaped filter elements is normally effected by the basically familiar method of centrifugal force, this process being supported by a reverse rinsing action. In some cases the residue nevertheless clings fairly firmly to the filtering surface, particularly if pasty, sticky or powdery; hence centrifugal force alone, and even in conjunction with reverse rinsing, does not always suffice to loosen the residue. Diverse mechanical methods are known for the supposedly unfailing removal of the residue from the filter surfaces. For example, scrapers of wire or tin may be provided between the individual elements of the filter. These initially rotate with the filter but subsequently are arrested from outside by mechanical means, producing relative motion between the scrapers and the filter plates, thus loosening the residue. However, the manifest disadvantages of these devices outweigh their usefulness.

The subject invention provides a simpler and more reliable means for the release of residues from filter elements. It was found that even the most obstinate materials could be successfully removed if a jet of some auxiliary medium, preferably gas, was blown on to the residue to loosen it from the filter elements, which are plane on top and inclined towards the filter axis below; this to be done simultaneously with rotation. A liquid can be used as the auxiliary medium in cases where this is permissible; such a liquid would be sprayed on.

The auxiliary medium would be applied from a nozzle or nozzles in accordance with the invention. These nozzles may be fixed or movable, e.g. adjustable in height. This latter may be arranged by means of a mechanical drive or an external cylinder type drive.

It was also found that some assistance was advantageous in removing the residues from the container if they were sticky, powdery or pasty. For this the invention suggests that the residues be removed from the filter case with the aid of an injector. An installation built in this way is performing excellently. The residues are carried out from the lower portion of the container into a pipe. The injector can also be mounted tangentially in the case, inducing tangential or spiral ejection of the residue.

The use of an injector obviates the need for traps or scrapers of large dimensions which are otherwise required. The residue once having fallen or been blown or rinsed to the bottom is immediately seized by the injector and pressed out through a relatively small aperture or into a pipe, and carried away. It is further possible to transport the residue directly into a circular chamber or channel by the use of compressed air. Where it is permissible to use a liquid as a carrier for the residue the injector can be operated with water or some other suitable liquid.

The drawing illustrates an example of how the invention may be implemented. Thus container 1 houses a vertical hollow shaft 2 which can be rotated by an electric motor 14 through the portion of conduit 17 which connects the shaft 2 to the motor 14, and which carries superposed inverted frusto-conical filter elements 3 which have a pervious horizontal circular upper wall 4. The lower wall 5 of said elements 3 are impervious and are downwardly inclined towards the hollow central shaft to permit the filtrate to flow into the shaft 2 and to the exterior through stationary pipe 2a.

In accordance with the invention, in cases of residues which cling particularly tenaciously an auxiliary medium is impelled onto the surfaces 4 from above, in addition to the centrifugal action and possible reverse rinsing with a gas or liquid. For example this may be done by means of a pipe feed 6 which can be fixed or adjustable in height and which terminates at its upper end in a nozzle 7. The auxiliary medium may comprise air, an inert gas or a liquid if such may be employed. The auxiliary medium is blown or sprayed under pressure onto the surfaces of the elements 3 in a strong, sharp jet. Obviously any desired number of jets may be used instead of just one as illustrated, if necessary. The jet 7, or jets, can be raised or lowered by moving pipe 6. This may be done with a rack and driven in any desired manner. Another preferred method is exemplified by a piston 8 which moves up and down in cylinder 9. According as the auxiliary medium is admitted via inlet 10 or inlet 11 into cylinder 9, the pipe 6 and hence the nozzle 7 move up or down. By means of a simple cycle-regulator i.e. a change-over valve, this motion can be made fully automatic. The same medium used for moving the piston 8 can be used to feed the nozzle 7, by having the pipe 6 open into cylinder 9 which is under pressure. Clearly and as already mentioned the up and down motion of the nozzle 7 can be induced by means of a mechanical drive. In this case the auxiliary medium is led through a separate feed to the pipe 6. This pipe 6 enters the filter case either through a stuffing-box or an O-ring gland as shown at 15.

The same installation can be used for washing the filter plates. Instead of the air normally used for loosening the residue, water or some washing fluid can be used.

The injector for removing the freed residue is designated 12. It is arranged towards the bottom of filter case 1 and preferably tangentially to its periphery and is directed towards the right angle outlet conduit 16 for the discharge of the residue. The liquid to be filtered is fed through inlet pipe 17.

What I claim is:

1. A filter comprising in combination a container having an outlet at the bottom thereof for the discharge of the filter residue and an inlet for the material to be filtered, a vertical hollow shaft rotatably mounted within said container, means to rotate said shaft, a stationary outlet pipe in communication with the lower end of said shaft and leading to the exterior of said container, a plurality of superposed inverted frusto-conical filter elements secured at their center to said shaft and extending radially outwardly therefrom, each filter element having a pervious substantially horizontal circular upper wall and an impervious frusto-conical lower wall merging with the periphery of said upper wall and downwardly inclined towards said hollow shaft, the space between said upper and lower walls being in communication with the interior of said hollow shaft, a vertical pipe passing through and having a sliding fit with said container and having a portion extending within said container adjacent said filter elements and a portion extending externally of said container and adapted to be connected to a source of gas under pressure, the inner end of said pipe forming a nozzle directed towards said filter elements for blowing a gaseous medium unto said upper walls of the filter elements successively in accordance with the vertical level of said nozzle, and means external to said container for vertically moving said pipe so constructed and arranged that the gaseous medium blown by said nozzle unto said upper walls of the filter elements will assist in the removal of the filter residue resting on said upper walls in conjunction with the effect of the centrifugal force exerted on said residue by the rotation of said shaft and filter elements about the vertical axis of said shaft.

2. A filter as claimed in claim 1, wherein said container has a cylindrical shape and said bottom has a frusto-conical shape, said outlet being constituted by a laterally and horizontally extending outlet pipe, and further including an injector opening within said bottom and directed towards said outlet pipe in order to inject a fluid under pressure for removing the filter residue in the bottom of said container and discharging the same through said outlet pipe.

References Cited in the file of this patent

UNITED STATES PATENTS

| | | |
|---|---|---|
| 920,739 | Hedges | May 4, 1909 |
| 1,131,675 | Bunker | Mar. 16, 1915 |
| 1,219,796 | Atkins | Mar. 20, 1917 |
| 1,344,215 | Sweetland | June 22, 1920 |
| 1,446,448 | Brown | Feb. 27, 1923 |
| 1,752,956 | Lex | Apr. 1, 1930 |
| 2,187,376 | Guibert | Jan. 16, 1940 |
| 2,278,453 | Kracklauer | Apr. 7, 1942 |
| 2,703,177 | Kunstorff | Mar. 1, 1955 |
| 2,737,300 | Kracklauer | Mar. 6, 1956 |
| 2,797,813 | Steinmann | July 2, 1957 |

FOREIGN PATENTS

| | | |
|---|---|---|
| 18,619 | Great Britain | Oct. 6, 1914 |
| 674,915 | Great Britain | July 2, 1952 |